United States Patent
McCarthy et al.

(10) Patent No.: US 7,382,289 B2
(45) Date of Patent: Jun. 3, 2008

(54) VEHICULAR COMMUNICATION SYSTEM

(75) Inventors: Kevin C. McCarthy, Tucson, AZ (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 586 days.

(21) Appl. No.: 11/053,436

(22) Filed: Feb. 8, 2005

(65) Prior Publication Data

US 2005/0156714 A1 Jul. 21, 2005

Related U.S. Application Data

(63) Continuation of application No. 10/777,812, filed on Feb. 12, 2004, now Pat. No. 6,909,361, which is a continuation of application No. 09/839,678, filed on Apr. 20, 2001, now Pat. No. 6,693,517, said application No. 10/777,812 is a continuation-in-part of application No. 10/365,794, filed on Feb. 13, 2003, now Pat. No. 6,832,719, which is a continuation of application No. 09/687,778, filed on Oct. 13, 2000, now Pat. No. 6,547,133, which is a continuation of application No. 09/057,428, filed on Apr. 8, 1998, now Pat. No. 6,158,655, said application No. 10/777,812 is a continuation-in-part of application No. 10/755,627, filed on Jan. 12, 2004, now Pat. No. 7,158,881, which is a continuation of application No. 10/287,178, filed on Nov. 4, 2002, now Pat. No. 6,678,614, which is a continuation of application No. 09/799,414, filed on Mar. 5, 2001, now Pat. No. 6,477,464, and a continuation-in-part of application No. 11/639,887, filed on Dec. 15, 2006, which is a continuation of application No. 10/407,395, filed on Apr. 4, 2003, now Pat. No. 7,151,997, which is a continuation of application No. 09/561,023, filed on Apr. 28, 2000, now Pat. No. 6,553,308.

(60) Provisional application No. 60/199,676, filed on Apr. 21, 2000, provisional application No. 60/187,960, filed on Mar. 9, 2000, provisional application No. 60/131,593, filed on Apr. 29, 1999.

(51) Int. Cl.
*G08G 1/123* (2006.01)
*G01C 21/30* (2006.01)

(52) U.S. Cl. .............................. 340/995.1; 340/995.12; 340/995.14; 701/209

(58) Field of Classification Search ............. 340/995.1, 340/995.12, 995.17, 988, 995.14; 345/629; 701/209, 210
See application file for complete search history.

(56) References Cited

U.S. PATENT DOCUMENTS 3,841,732 A 10/1974 Marks ........................ 359/296

(Continued)

FOREIGN PATENT DOCUMENTS

| DE | 3605704 | 8/1987 |
|---|---|---|
| EP | 0979758 | 2/2000 |
| JP | 11131880 A | 5/1999 |
| JP | 01 175898 A | 6/2001 |

OTHER PUBLICATIONS

Commonly assigned co-pending U.S. Appl. No. 10/958,087, filed Oct. 4, 2004, entitled Vehicle Accessory Module.

*Primary Examiner*—Toan N Pham
(74) *Attorney, Agent, or Firm*—Van Dyke, Gardner, Linn & Burkhart LLP

(57) ABSTRACT

A vehicular communication system comprises a wireless communication link from the vehicle to an external provider of information or service. Data pertaining to at least one of the location and the direction heading of the vehicle is communicated to the external provider from the vehicle via the conimunication link. This data is derived at least in part from a global positioning system that determines the geographic location and/or the direction heading of the vehicle. The external provider wirelessly provides information or service back to the vehicle via the communication link that is at least in part customized to the geographic location and/or direction heading of the vehicle.

25 Claims, 3 Drawing Sheets

U.S. PATENT DOCUMENTS

| | | | |
|---|---|---|---|
| 4,447,808 A | 5/1984 | Marcus | 340/696 |
| 4,546,551 A | 10/1985 | Franks | 33/356 |
| 4,793,690 A | 12/1988 | Gahan et al. | 350/279 |
| 4,882,565 A | 11/1989 | Gallmeyer | 340/461 |
| 4,953,305 A | 9/1990 | Van Lente et al. | 33/386 |
| 5,012,077 A | 4/1991 | Takano | 235/380 |
| 5,072,380 A | 12/1991 | Randelman et al. | 364/406 |
| 5,193,029 A | 3/1993 | Schofield et al. | 359/604 |
| 5,255,442 A | 10/1993 | Schierbeek et al. | 33/361 |
| 5,285,060 A | 2/1994 | Larson et al. | 250/214 AL |
| 5,310,999 A | 5/1994 | Claus et al. | 235/384 |
| 5,416,313 A | 5/1995 | Larson et al. | 250/214 AL |
| 5,416,478 A | 5/1995 | Morinaga | 340/995 |
| 5,455,716 A | 10/1995 | Suman et al. | 359/872 |
| 5,485,520 A | 1/1996 | Chaum et al. | 380/24 |
| 5,530,240 A | 6/1996 | Larson et al. | 250/214 AL |
| 5,576,687 A | 11/1996 | Blank et al. | 340/438 |
| 5,590,038 A | 12/1996 | Pitroda | 235/380 |
| 5,631,638 A | 5/1997 | Kaspar et al. | 340/902 |
| 5,632,092 A | 5/1997 | Blank et al. | 33/361 |
| 5,644,851 A | 7/1997 | Blank et al. | 33/361 |
| 5,663,548 A | 9/1997 | Hayashi et al. | 325/384 |
| 5,668,663 A | 9/1997 | Varaprasad et al. | 359/608 |
| 5,680,263 A | 10/1997 | Zimmermann | 359/872 |
| 5,699,044 A | 12/1997 | Van Lente et al. | 340/525 |
| 5,708,410 A | 1/1998 | Blank et al. | 340/438 |
| 5,710,702 A | 1/1998 | Hayashi et al. | 235/384 |
| 5,724,187 A | 3/1998 | Varaprasad et al. | 359/608 |
| 5,724,316 A | 3/1998 | Brunts | 368/10 |
| 5,737,226 A | 4/1998 | Olson et al. | 701/224 |
| 5,761,094 A | 6/1998 | Olson et al. | 702/92 |
| 5,790,973 A | 8/1998 | Blaker et al. | 701/123 |
| 5,793,027 A | 8/1998 | Baik | 235/380 |
| 5,802,727 A | 9/1998 | Blank et al. | 33/356 |
| 5,872,513 A | 2/1999 | Fitzgibbon | 340/539 |
| 5,877,707 A | 3/1999 | Kowalick | 340/988 |
| 5,878,353 A | 3/1999 | ul Azam et al. | 455/550 |
| 5,878,370 A | 3/1999 | Olson | 701/224 |
| 5,899,956 A | 5/1999 | Chan | 701/213 |
| 5,910,854 A | 6/1999 | Varaprasad | 359/273 |
| 5,940,503 A | 8/1999 | Palett et al. | 379/454 |
| 5,959,367 A | 9/1999 | O'Farrell et al. | 307/10.1 |
| 5,962,833 A | 10/1999 | Hayashi | 235/384 |
| 5,971,552 A * | 10/1999 | O'Farrell et al. | 359/871 |
| 5,995,898 A | 11/1999 | Tuttle | 701/102 |
| 6,011,518 A | 1/2000 | Yamagishi et al. | 343/713 |
| 6,023,229 A | 2/2000 | Bugno et al. | 340/693.5 |
| 6,087,953 A | 7/2000 | DeLine et al. | 340/815.4 |
| 6,098,879 A | 8/2000 | Terranova | 235/384 |
| 6,106,121 A | 8/2000 | Buckley et al. | 359/839 |
| 6,116,743 A | 9/2000 | Hoek | 359/871 |
| 6,140,933 A | 10/2000 | Bugno et al. | 340/693.5 |
| 6,158,655 A | 12/2000 | DeVries, Jr. et al. | 235/380 |
| 6,166,698 A * | 12/2000 | Turnbull et al. | 343/713 |
| 6,172,613 B1 | 1/2001 | DeLine et al. | 340/815.4 |
| 6,173,501 B1 | 1/2001 | Blank et al. | 33/356 |
| 6,175,164 B1 | 1/2001 | O'Farrell et al. | 307/10.1 |
| 6,222,460 B1 | 4/2001 | DeLine et al. | 340/815.4 |
| 6,243,003 B1 | 6/2001 | DeLine et al. | 340/425.5 |
| 6,259,412 B1 | 7/2001 | Duroux | 343/713 |
| 6,262,831 B1 | 7/2001 | Bauer et al. | 359/265 |
| 6,278,377 B1 | 8/2001 | DeLine et al. | 340/815.4 |
| 6,297,781 B1 * | 10/2001 | Turnbull et al. | 343/713 |
| 6,326,613 B1 | 12/2001 | Heslin et al. | 250/239 |
| 6,329,925 B1 | 12/2001 | Skiver et al. | 340/815.4 |
| 6,366,213 B2 | 4/2002 | DeLine et al. | 340/815.4 |
| 6,386,742 B1 | 5/2002 | DeLine et al. | 362/494 |
| 6,418,376 B1 | 7/2002 | Olson | 701/224 |
| 6,420,975 B1 * | 7/2002 | DeLine et al. | 340/815.4 |
| 6,427,349 B1 | 8/2002 | Blank et al. | 33/356 |
| 6,428,172 B1 | 8/2002 | Lynam et al. | 359/838 |
| 6,465,963 B1 | 10/2002 | Turnbull et al. | 315/82 |
| 6,477,464 B2 | 11/2002 | McCarthy et al. | 701/213 |
| 6,513,252 B1 | 2/2003 | Schierbeek et al. | 33/356 |
| 6,515,378 B2 | 2/2003 | Drummond et al. | 307/10.1 |
| 6,539,306 B2 | 3/2003 | Turnbull | 701/219 |
| 6,547,133 B1 | 4/2003 | DeVries, Jr. et al. | 235/380 |
| 6,553,308 B1 * | 4/2003 | Uhlmann et al. | 701/208 |
| 6,642,851 B2 | 11/2003 | DeLine et al. | 340/815.4 |
| 6,678,614 B2 | 1/2004 | McCarthy et al. | 701/213 |
| 6,690,268 B2 | 2/2004 | Schofield et al. | 340/438 |
| 6,693,517 B2 | 2/2004 | McCarthy et al. | 340/425.5 |
| 6,742,905 B2 | 6/2004 | Suyama et al. | 359/838 |
| 6,746,127 B2 | 6/2004 | Suyama | 359/838 |
| 6,824,281 B2 | 11/2004 | Schofield et al. | 359/876 |
| 6,970,073 B2 * | 11/2005 | Drummond et al. | 340/425.5 |
| 2002/0159270 A1 | 10/2002 | Lynam et al. | 362/492 |
| 2002/0190120 A1 | 12/2002 | Pentel | 235/375 |
| 2003/0020603 A1 | 1/2003 | DeLine et al. | 340/425.5 |
| 2003/0191583 A1 | 10/2003 | Uhlmann et al. | 701/208 |
| 2004/0057131 A1 | 3/2004 | Hutzel et al. | 359/838 |
| 2004/0145457 A1 | 7/2004 | Schofield et al. | 340/425.5 |
| 2004/0148102 A1 | 7/2004 | McCarthy et al. | 701/213 |
| 2004/0160313 A1 | 8/2004 | McCarthy et al. | 340/425.5 |

* cited by examiner

VEHICULAR COMMUNICATION SYSTEM

CROSS-REFERENCE TO RELATED APPLICATION

This application is a continuation of patent application Ser. No. 10/777,812, filed on Feb. 12, 2004, now U.S. Pat. No. 6,909,361, which is a continuation of application Ser. No. 09/839,678, filed on Apr. 20, 2001, now U.S. Pat. No. 6,693,517, which claims priority from U.S. provisional patent application Ser. No. 60/199,676, filed on Apr. 21, 2000, the disclosures of which are hereby incorporated herein by reference in their entirety, and application Ser. No. 10/777,812 is a continuation-in-part of U.S. patent application Ser. No. 10/365,794, filed on Feb. 13, 2003, now U.S. Pat. No. 6,832,719, which is a continuation of application Ser. No. 09/687,778, filed Oct. 13, 2000, now U.S. Pat. No. 6,547,133, which is a continuation of application Ser. No. 09/057,428, filed Apr. 8, 1998, now U.S. Pat. No. 6,158,655, and application Ser. No. 10/777,812 is a continuation-in-part of U.S. patent application Ser. No. 10/755,627, filed on Jan. 12, 2004, now U.S. Pat. No. 7,158,881, which is a continuation of U.S. patent application Ser. No. 10/287,178, filed on Nov. 4, 2002, now U.S. Pat. No. 6,678,614, which is a continuation of U.S. patent application Ser. No. 09/799,414, filed on Mar. 5, 2001, now U.S. Pat. No. 6,477,464, which claims priority from U.S. provisional patent application Ser. No. 60/187,960, filed on Mar. 9, 2000; and the present application is a continuation-in-part of U.S. patent application Ser. No. 11/639,887, filed Dec. 15, 2006, which is a continuation of application Ser. No. 10/407,395, filed Apr. 4, 2003, now U.S. Pat. No. 7,151,997, which is a continuation of application Ser. No. 09/561,023, filed Apr. 28, 2000, now U.S. Pat. No. 6,553,308, which claims the benefit of U.S. provisional application Ser. No. 60/131,593, filed Apr. 29, 1999.

BACKGROUND OF THE INVENTION

This invention relates to data and information communication within an automobile and particularly to automotive mirror assemblies adapted to communicate wirelessly with other vehicular accessories and/or with personal accessories of occupants of the vehicle.

SUMMARY OF THE INVENTION

A vehicle may have features and/or accessories connected by a variety of wireless links and/or wired links, such as are described in commonly assigned U.S. patent No. 6,396,408, issued to Drummond et al., for a DIGITAL ELECTROCHROMIC CIRCUIT WITH A VEHICLE NETWORK, which claims priority from U.S. provisional patent application Ser. No. 60/196,577, filed on Mar. 31, 2000, by Lynam et al., for a DIGITAL ELECTROCHROMIC CIRCUIT WITH A VEHICLE NETWORK SUCH AS A CAR AREA NETWORK OR A LOCAL INTERCONNECT NETWORK, and U.S. Pat. No. 6,294,989, issued to Schofield et al., for a TIRE INFLATION ASSISTANCE MONITORING SYSTEM, the disclosures of which are hereby incorporated herein by reference. For example, some vehicle features, accessories and functions can be interconnected by and/or can communicate by wire connection, by wireless infrared communication, wireless microwave communication, by wireless RF communication, or by any combination of the above.

As described also in commonly assigned U.S. Pat. No. 6,690,268 issued to Schofield et al., for VIDEO MIRROR SYSTEMS INCORPORATING AN ACCESSORY MODULE, which relates to U.S. provisional application Ser. No. 60/263,680, filed on Jan. 23, 2001, by Lynam et al., entitled VIDEO MIRROR SYSTEMS INCORPORATING AN ACCESSORY MODULE, U.S. provisional application Ser. No. 60/243,986, filed on Oct. 27, 2000, by Lynam et al., entitled VIDEO MIRROR SYSTEMS INCORPORATING AN ACCESSORY MODULE, U.S. provisional application Ser. No. 60/238,483, filed on Oct. 6, 2000, by Lynam et al., entitled VIDEO MIRROR SYSTEMS, U.S. provisional application Ser. No. 60/237,077, filed on Sept. 30, 2000, by Lynam et al., entitled VIDEO MIRROR SYSTEMS, U.S. provisional application Ser. No. 60/234,412, filed on Sept. 21, 2000, by Lynam et al., entitled VIDEO MIRROR SYSTEMS, U.S. provisional application Ser. No. 60/218,336, filed on Jul. 14,2000, by Lynam et al., entitled INTERIOR REARVIEW MIRROR ASSEMBLY INCORPORATING A VIDEO SCREEN, and U.S. provisional patent application Ser. No. 60/186,520, filed on Mar. 2, 2000, by Lynam et al., for an INTERIOR REARVIEW MIRROR ASSEMBLY INCORPORATING A VIDEO SCREEN, and in commonly assigned U.S. Pat. Nos. 6,000,823 and 5,959,367, all of the disclosures of which are hereby incorporated herein by reference, the vehicle and particularly the interior/exterior mirror assembly can host a variety of features and accessories. Also, such features and accessories can be connected via cable elements, such as coaxial cable, a multi-ribbon cable, a multiwire cable, and/or a fiber-optic cable (for communicating by optical method), or can be connected without wires, such as by short range RF wireless communication such as provided by Motorola, Schaumberg, Ill, via their BLUETOOTH protocol or by infrared wireless communication such as provided via the IrDA protocol available from Clarinet System Inc. of San Jose, CA.

The present invention is particularly suitable for use in a "connected car," i.e., an automobile in two-way communication with a remote party such as by a telematic wireless communication link, and most preferably, connected to an information source such as the WorldWide WEB via the INTERNET. This present invention provides compatibility and interoperability for mobile devices, such as hand-held mobile phones, personal digital assistants (PDA) such as a PalmPilot PDA, hand-held personal identifiers, hand-held remote entry devices, such as a key fob as known in the automotive arts including active and passive entry key fobs, and the like.

Accessories may be provided at the purchase of the vehicle as in-vehicle installed items or may be carried in and out of the vehicle by the user. Such can be provided with ports or interfaces adapted to communicate via the use of a cable or wired communication, but more preferably a wireless communication. For example, a modular phone may be equipped with an RF communication link operating under a short-range wireless communication protocol, such as BLUETOOTH available from Motorola of Schaumberg, Ill., that communicates with the vehicle wirelessly so that, for example, telephone communication can be conducted via the audio system of the vehicle while the occupant possessing the BLUETOOTH-equipped phone is using the phone. Likewise, a phone or other mobile device can be equipped with an infrared (IR) communication interface/port such as an IrDA port than can provide wireless infrared connectivity.

A vehicle mirror-based wireless communication system, according to an aspect of the invention, includes an interior rearview mirror assembly including an interior mirror reflective element, a housing for the reflective element, and a mirror-mounted communication device. The mirror-mounted communication device includes a communication data port for short-range communication with a mobile device that is a personal accessory of an occupant of the vehicle. The communication device further includes a telecommunication link from the vehicle to an external provider of information or service. In this manner, the communication device provides connectivity between a low-power mobile device and a provider of information or service separated from the vehicle.

A vehicle mirror-based wireless communication system, according to another aspect of the invention, includes an interior rearview mirror assembly including an interior mirror reflective element and a housing for the reflective element. A remote telematic server is provided that is remote from the vehicle. A vehicular dynamic interactive communication system is provided at the rearview mirror assembly. The communication system includes a Global Positioning System (GPS) for determining a geographic location of the vehicle and a first communication link with the remote telematic server. The mirror-based wireless communication system further includes at least one service provider and a second communication link between the at least one service provider and the telematic server. In this manner, the communication system communicates identification data to the telematic server pertaining to either the location, identity and/or direction heading of the vehicle. The at least one service provider provides assistance data to the vehicle via the first and second communication links. The assistance data is customized to the location identity and/or direction heading of the vehicle.

These and other objects, advantages and features of this invention will become apparent upon review of the following specification in conjunction with the drawings.

DESCRIPTION OF THE PREFERRED EMBODIMENT

Figure 1:
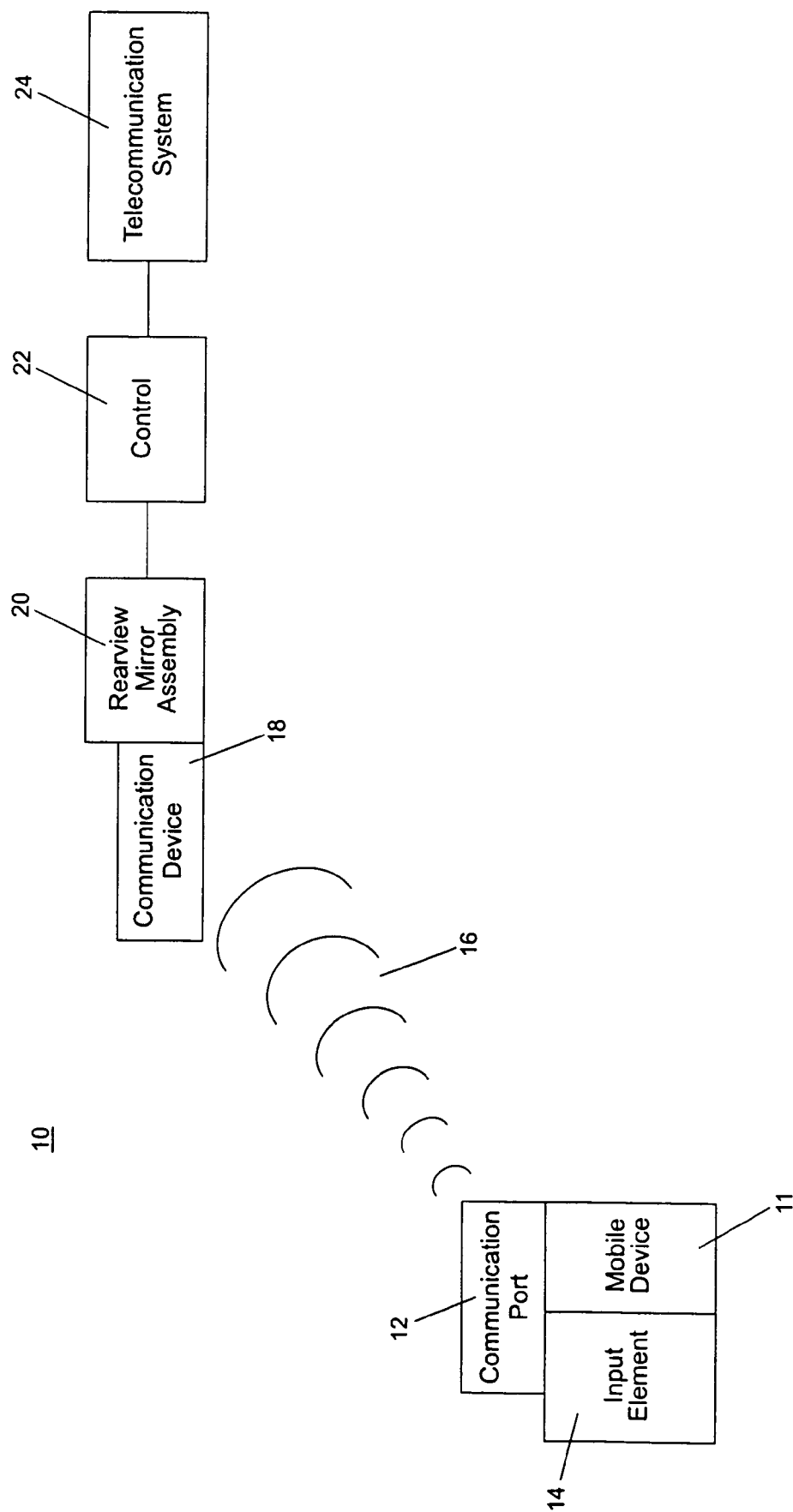
FIG. 1 is an electrical block diagram of a vehicle mirror-based wireless communication system, according to the invention.

In order for mobile devices to be used within the interior cabin of a vehicle, such as an automobile, the vehicle must be equipped with at least one complementary interface/port capable of wireless communication with the mobile device within the vehicle cabin, or when approaching the vehicle from the exterior. Where wireless infrared connectivity is used, it is preferred that line-of-sight communication be possible between the mobile device and the interface/port of the vehicle that serves as the interface and exchange point for data between the mobile device and the vehicle electronics system/accessories. In this regard, placement of an IR data port at the interior rearview mirror assembly (such as at or in the case/bezel of the assembly, or attached to the mirror assembly support about which the casing housing is adjustable, or at or in a pod attached to the attachment mount of the interior mirror assembly to the vehicle, such as to a mirror mounting button on a windshield as are known in the mirror arts) has the advantage of being high mounted and central, and so accessible to all vehicle occupants including those in both the front seats and in rear seats.

The interior rearview mirror of the vehicle (and optionally an exterior side view mirror of the vehicle) is preferably equipped with at least one infrared communication port such as an IrDA (Infrared Data Port) such as the devices available from by Clarinet Systems Inc., San Jose, Calif. for wireless connectivity to other IrDA devices such as the Personal Digital Assistants (PDA) like the Palm Pilot Palm III, IIIx, V, VII, Glenarye pager, Motorola 2000X Pagewriter, and similar devices and cellular phones equipped with IrDA ports such as the Nokia 6210, Windows CE devices, laptop computers, and similar mobile devices having wireless communication capabilities to paging, cellular, or satellite systems. Also, by connecting a mobile device to the vehicle via a vehicle-mounted, preferably mirror-mounted, wireless connectivity interface/port, a low-feature and/or low-power mobile device can be linked to the vehicle, and the vehicle (including its on-board computer) can serve as the modem/communication port/computer for the mobile device, thus greatly expanding the capability of the mobile device. This enables wireless connectivity of devices that originally could not act as a wireless modem.

Also, mobile devices typically have restricted display capabilities. By connecting wirelessly to the vehicle and to the vehicle's electronics (such as a vehicle computer), the greater display capability and/or greater computing power of the vehicle (such as a vehicle video display, preferably mirror-mounted, such as disclosed in commonly assigned U.S. Pat. No. 6,690,268 issued to Schofield et al., for VIDEO MIRROR SYSTEMS INCORPORATING AN ACCESSORY MODULE, which relates to U.S. provisional application Ser. No. 60/263,680, filed on Jan. 23, 2001, by Lynam et al., entitled VIDEO MIRROR SYSTEMS INCORPORATING AN ACCESSORY MODULE, U.S. provisional application Ser. No. 60/243,986, filed on Oct. 27, 2000, by Lynam et al., entitled VIDEO MIRROR SYSTEMS INCORPORATING AN ACCESSORY MODULE, U.S. provisional application Ser. No. 60/238,483, filed on Oct. 6, 2000, by Lynam et al., entitled VIDEO MIRROR SYSTEMS, U.S. provisional application Ser. No. 60/237,077, filed on Sept. 30, 2000, by Lynam et al., entitled VIDEO MIRROR SYSTEMS, U.S. provisional application Ser. No. 60/234,412, filed on Sep. 21, 2000, by Lynam et al., entitled VIDEO MIRROR SYSTEMS, U.S. provisional application Ser. No. 60/218,336, filed on Jul. 14, 2000, by Lynam et al., entitled INTERIOR REARVIEW MIRROR ASSEMBLY INCORPORATING A VIDEO SCREEN, and U.S. provisional patent application Ser. No. 60/186,520, filed Mar. 2, 2000, by Lynam et al., for an INTERIOR REARVIEW MIRROR ASSEMBLY INCORPORATING A VIDEO SCREEN, the disclosures of which are hereby incorporated herein by reference), can be accessed and used by the mobile device.

A separate display is located behind the mirror reflector. In such a configuration where a display element is behind the mirror reflector, the reflective mirror coating of the mirror reflective element can be locally at least partially removed at the location of the display element disposed behind the mirror element. Optionally, where all the reflective mirror coating is removed, a semitransparent but significantly reflecting coating or series of coatings (such as a thin metal film coating or a multilayer of coatings, including a thin metal coating of silver, aluminum, rhodium (or their alloys), or the like, or a dichroic coating or coating stack, can be used that substantially masks the display element from driver notice until the display element is powered to display information, such as disclosed in U.S. Pat. Nos. 5,668,663 and 5,724,187, which are incorporated by reference in their entireties. Such has been described as "display on demand" in the art. Such display can include a "display on demand" such as disclosed in U.S. Pat. Nos. 5,668,663 and 5,724,187 noted above. In this regard, it is preferable that the display be a light-emitting display, such as a fluorescent display, a vacuum fluorescent display, a field emission display, an electroluminescent display, a fluorescent display, a plasma display, or a light-emitting diode display, such as an organic or inorganic light-emitting diode display. Alternatively, the reflective element may comprise a substantially reflecting, significantly light-transmitting reflective element, such as disclosed in U.S. Pat. Nos. 5,668,663 and 5,724,187 noted above. An example, such as a semitransparent reflector, would be a third surface reflector coated on the third surface of an electrochromic mirror element, as known in the electrochromic mirror art, consisting of a thin metal coating (such as of silver, silver alloy, aluminum, aluminum alloy) that is significantly reflecting of at least 60%, preferably at least 70% and most preferably at least 75% but also significantly transmitting in the range of between 5% to 30%, preferably in the range of between 10% and 25% and most preferably in the range of between 15% and 20%. Preferably, the thin metal coating is overcoated with a transparent conductor such as indium tin oxide when contacting an electrochromic medium (preferably an electrochromic solid polymer film) when serving as a combined third surface reflector/conductor layer in an electrochromic laminate cell construction. For further details of suitable reflective elements with portions of the reflective mirror coating adapted to permit light to transmit through the reflective element or of a highly reflecting/significantly transflective reflective element, reference is made to U.S. Pat. Nos. 5,668,663 and 5,724,187.

This access can be facilitated via protocols such as the Wireless Application Protocol (WAP) for mobile devices and can be networked via sub-networks of the WorldWide Web by systems providers such as JP Systems Inc. of Dallas, Tex. Such networks are designed for mobile devices and include client applications, gateways, and backed servers integrating with open standards, such as WAP. The server compresses and optimizes data so that it can be sent to wireless devices in a format that is best suited to those devices. Typically this data is displayed in a few lines of text, preferably a scrolling line of text data, to suit such mobile interactive transceivers. When connected within a vehicle, preferably such data is displayed at the interior rearview mirror.

As described in commonly assigned U.S. Pat. No. 6,477,464 issued to McCarthy et al., for a COMPLETE MIRROR-BASED GLOBAL-POSITIONING SYSTEM (GPS) NAVIGATION SOLUTION, which claims priority from U.S. provisional patent application Ser. No. 60/187,960 filed on Mar. 9, 2000, by McCarthy et al., for a COMPLETE MIRROR-BASED GLOBAL-POSITIONING SYSTEM (GPS) NAVIGATION SOLUTION, and U.S. Pat. No. 6,553,308 issued to Uhlmann et al., for a VEHICLE NAVIGATION SYSTEM WITH SMART MAP FILTERING, PORTABLE UNIT HOME-BASE REGISTRATION AND MULTIPLE NAVIGATION SYSTEM PREFERENTIAL USE, which claims priority from U.S. provisional application Ser. No. 60/131,593 filed on Apr. 29, 1999, by Uhlmann et al., for a VEHICLE-BASED NAVIGATION SYSTEM WITH A SMART MAP FILTERING, PORTABLE UNIT HOME-BASED REGISTRATION AND MULTIPLE NAVIGATION SYSTEM PREFERENTIAL USE, the disclosures of which are hereby incorporated herein by reference, provision of a display and particularly a scrolling text display at the interior rear view assembly of the vehicle (and/or the exterior rear view mirror assembly) has many advantages including ease of readability and recognition by the driver of the vehicle.

The interfacing of a mobile accessory to the vehicle via a wireless link, preferably a wireless IR link, can be further enhanced by linking to the vehicle's GPS system. The GPS system can provide location/directional information to the driver. This can facilitate a PUSH communication protocol whereby information and messages are automatically transmitted to the driver. Alternatively, or in addition, a PULL communication protocol can be used whereby the driver selects information at his/her request only. This optionally can be a user-defined option. For example, assume the vehicle equipped with the present invention is approaching a service/convenience/food supplier such as a Starbucks coffee location or a service station. The in-vehicle GPS system can alert the WAP hardware located either in the vehicle or, through the IrDA port, on the handheld device and offer a discount such as a $0.25 electronic coupon if the driver decides to stop for a particular purchase at that store. The vehicle location is wirelessly transmitted from the vehicle to a system such as ONSTAR™ available from General Motors or a similar system. The location of the vehicle is then provided to a service location proximate to the location of the vehicle or in the direction of travel of the vehicle. Such service provider(s) can then communicate wirelessly back to the vehicle specific information/service offers/discount information/advertisements, and the driver or other occupants of the vehicle can make decisions based on this received information and/or can specifically communicate with such service provider(s). Also, INTERNET and/or telemetry sites and services can be provided at a low cost or free to the driver, and with the compensation to the remote service provider be via advertisements received at the vehicle and displayed to the driver. By linking via the GPS system of the vehicle, such advertisements can be customized to suit the particular geographic location where the vehicle is located. Also, customized entertainment and/or information can be provided by wireless communication to the vehicle, such as from a digital satellite radio station, and with content, such as advertisements, local news broadcasts, weather data, traffic data, and the like, customized to the particular location of the vehicle via dynamic interactive communication that communicates GPS data concerning the vehicle location and heading, generated by an in-vehicle GPS system, from the vehicle to a remote receiver (such as a web site, telemetry service or media station) via wireless transmission and receiving of data to and from the vehicle, and, preferably, via an IrDA-port, to a mobile device such as a personal cell phone or PDA in the vehicle.

Another embodiment of the invention is the placement of mobile device communication ports such IrDA ports in the vehicle cabins of automobiles in a rental car fleet. Preferably, the communication port, such as an IrDA port, is placed at the interior rearview mirror assembly, as this is a central location that is readily accessed by a variety of drivers, many of who will be new to the type of rented model, but who will have had previous familiarity with accessing a mirror-mounted IrDA port. This would enable the temporary user of the vehicle access mobile communication and services as well as communication to the rental company if the vehicle breaks down or requires servicing. Certain vehicles could also be equipped with faxes and keyboards for a mobile office capable of sending and receiving information.

In addition to these features, the IrDA port can serve as the interface to systems within the mirror such as a palm-sized keyboard similar to a handheld PDA where the operator can compose, edit, and access systems located in the mirror. This system can be available as an option because, due to the open architecture of the IrDA port, the operator can also interface the system with the existing PDA, phone, or other mobile device capable of composing or editing messages. This provides a useful interface for the operator for entering street addresses and E-mail messages.

In addition, the interior rearview mirror assembly can aid in the interfacing of the mobile communication protocol/needs of a particular brand/model of mobile device (such as, for example, a Palm Pilot™ PDA) to a particular vehicle model of a car manufacturer. For example, the vehicle bus system for a GM vehicle may be different than the architecture for a Ford vehicle. The interior mirror assembly in the respective model/brand of vehicle can function to allow the PalmPilot™, for example, owned by a person to interact with whatever automobile that person carries that PalmPilot™ into, whether a GM vehicle, a Ford vehicle or any other vehicle equipped with a mirror-mounted IrDA-port.

FIG. 1 illustrates an embodiment of the present invention. Mirror-mounted wireless communication system 10 includes a mobile device 11 equipped with a mobile device communication port 12 (preferably an IrDA-port that transmits/receives data via infrared wireless communication). When data is input to mobile device 11 via input element 14 (which may be a keypad or a touch or stylus actuated screen), a communication signal 16 is wirelessly transmitted to mirror-mounted communication device 18 mounted at interior rearview mirror assembly 20 that is located within the interior cabin of a vehicle (not shown). Preferably, interior mirror assembly 20 is in electronic/data communication with the vehicle electronic system/accessories schematically represented by control 22 in FIG. 1. Control 22 links to vehicle-based telecommunication system 24 that provides a wireless telecommunication link from the vehicle to an external service/information provider.

Also, the mobile device may wirelessly communicate with the vehicle when the driver is approaching the vehicle when parked, such as to provide identity to the vehicle in order to activate/deactivate a security system, an entry system such as door locks, and the like. Also, the mobile device can take part in vehicle-based remote transactions, such as purchases, banking transactions, and the like, such as are described in commonly assigned U.S. Pat. No. 6,158,655, the disclosure of which is hereby incorporated herein by reference. The mobile device, such as a PDA, may include driver license, insurance, registration and similar data that can be displayed to the like of a police officer using a vehicle-based video screen. The vehicle can have built-in codes that authorize use of the vehicle by particular drivers/owners of particular mobile devices.

Figure 2:
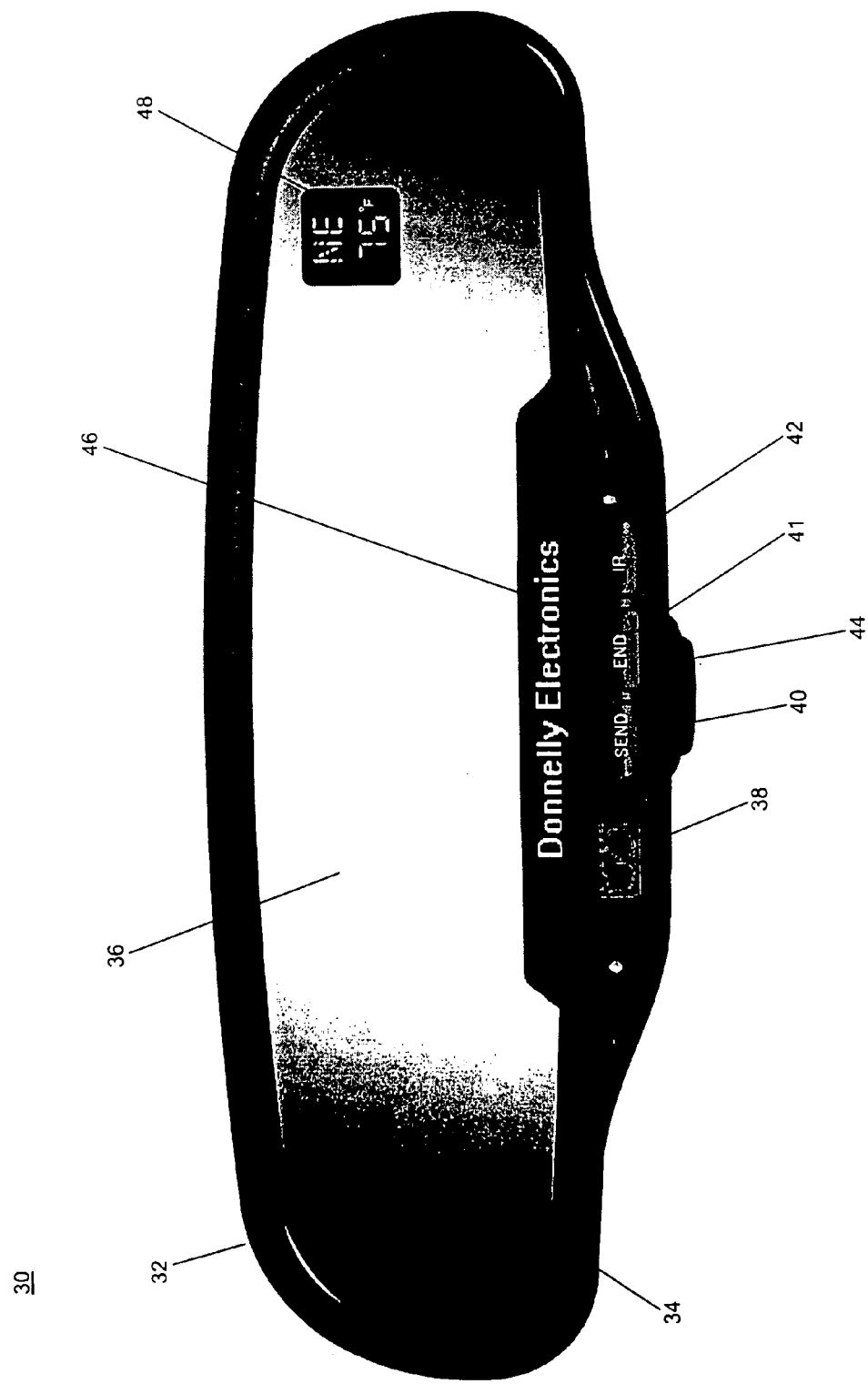
FIG. 2 is a front elevation of an interior rearview mirror assembly, according to the invention.

An interior rearview mirror system 30 incorporating the present invention is shown in FIG. 2. Interior rearview mirror assembly 32 includes a mirror reflector element 36 that is within mirror casing 34. Reflector element 36 may be a prismatic mirror element or an electrically variable reflectance element such as an electro-optic reflective element such as an electrochromic reflective element such as described in commonly assigned U.S. Pat. Nos. 5,140,455; 5,151,816; 5,567,360; 5,525,264; 5,610,756; 5,406,414; 5,253,109; 5,076,673; 5,073,012 or 5,117,346, which are hereby incorporated herein by reference, and in publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Grandquist, EDS., Optical Engineering Press, Washington (1990), the disclosures of which are hereby incorporated by reference herein in their entireties.

A communication transmitting and/or receiving data port 38 is located in the front, lower bezel portion of casing 34, below mirror reflector element 36. When mirror system 30 is mounted in a vehicle (such as attached to a vehicle windshield or to a vehicle header, as is known in the mirror art), communication port 38 is adapted to receive data from and/or transmit data to a mobile device (such as a PDA or a cellular phone) by wireless data communication. Preferably, communication port 38 comprises an IR data port. Manually operated controls, 40, 41 and 42, facilitate exchange of data between mirror system 30 and a mobile device. Mirror system 30 also includes a multi-text display 46, that preferably comprises a multi-pixel display, more preferably a reconfigurable display and most preferably a display capable of scrolling, such as described in commonly assigned U.S. Pat. No. 6,477,464 issued to McCarthy et al., for a COMPLETE MIRROR-BASED GLOBAL-POSITIONING SYSTEM (GPS) NAVIGATION SOLUTION, which claims priority from U.S. provisional application Ser. No. 60/187,960 filed on Mar. 9, 2000, by McCarthy et al., for a COMPLETE MIRROR-BASED GLOBAL-POSITIONING SYSTEM (GPS) NAVIGATION SOLUTION, and U.S. patent application Ser. No. (09/817,874, filed on Mar. 26, 2001, by Quist et al., for an INTERACTIVE AUTOMOTIVE REAR VISION SYSTEM, which claims priority from U.S. provisional application Ser. No. 60/192,721, filed on Mar. 27, 2000, by Lynam et al., for an INTERACTIVE AUTOMOTIVE REAR VISION SYSTEM, the disclosures of which are hereby incorporated herein by reference. Mirror system 30 also includes a display of compass direction and external or interior vehicular temperature.

Also, a mobile device in data communication with mirror system 30 can optionally attach to or dock with the interior mirror assembly, and/or can form a pendant accessory thereto, such as is described in commonly assigned U.S. Pat. No. 6,428,172 issued to Hutzel et al., for a REARVIEW MIRROR ASSEMBLY WITH UTILITY FUNCTIONS, the disclosure of which is hereby incorporated herein by reference.

Also, the mobile device can link to a vehicle bus system, such as a CAN or LIN system such as disclosed in commonly assigned U.S. Pat. No. 6,.396,408 issued to Drummond et al., for a DIGITAL ELECTROCUROMIC CIRCUIT WITH A VEHICLE NETWORK, which claims priority from U.S. provisional patent application Ser. No. 60/196,577, filed on Mar. 31, 2000, by Lynam et al., for a DIGITAL ELECTROCHROMIC CIRCUIT WITH A VEHICLE NETWORK SUCH AS A CAR AREA NETWORK OR A LOCAL INTERCONNECT NETWORK, the disclosures of which are hereby incorporated herein by reference, via data communication with communication port 38 of mirror system 30.

Figure 3:
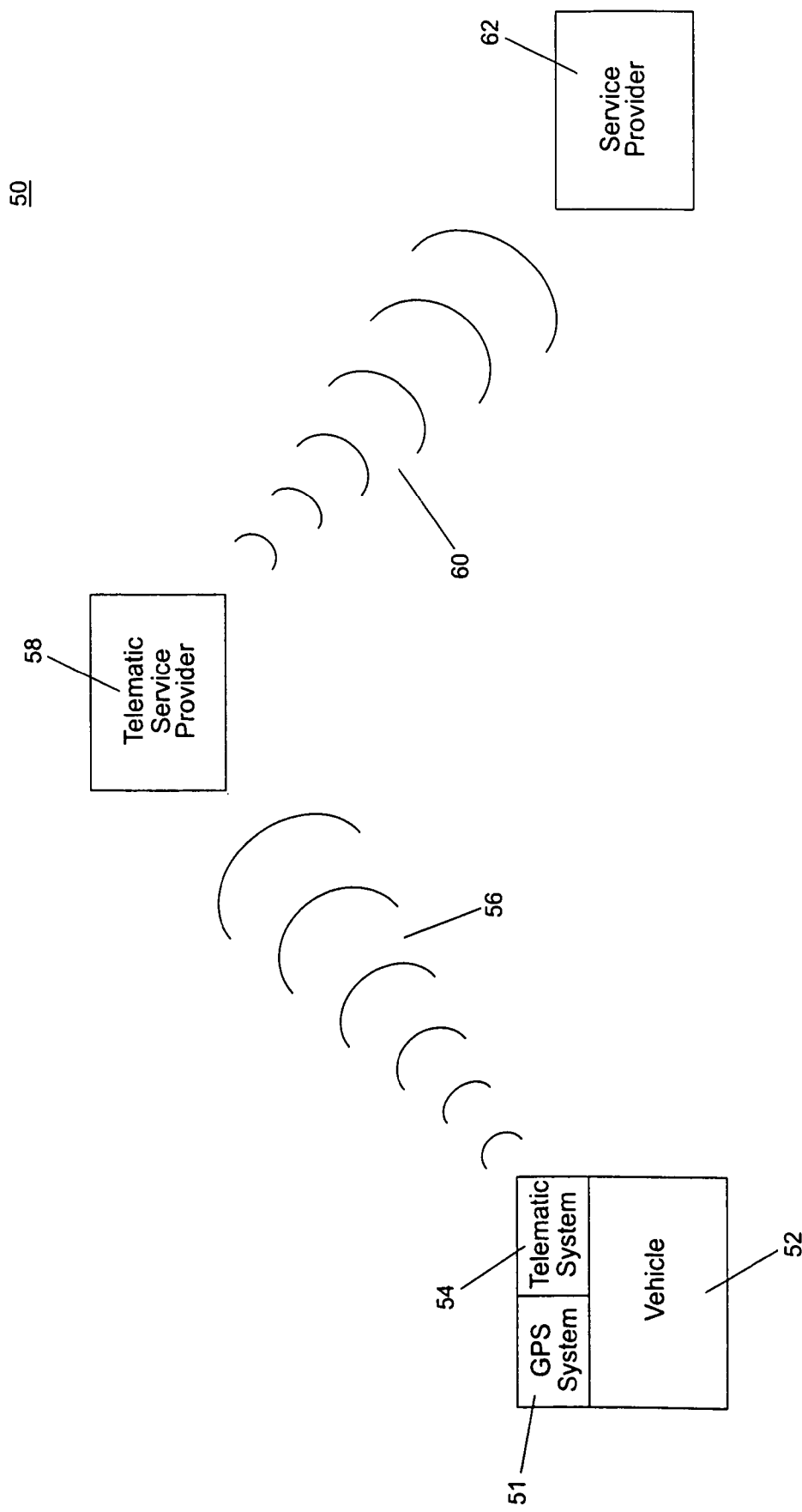
FIG. 3 is an electronic block diagram of a vehicle mirror-based wireless communication system, according to another aspect of the invention.

A vehicular dynamic interactive communication system 50 is shown in FIG. 3. Vehicle 52 includes an in-vehicle GPS system 51 that receives GPS information from a satellite system (not shown) that identifies the geographic location of the vehicle, and its direction while travelling on a highway. This data and other information, such as vehicle type, driver personal information, and the like, is processed by in-vehicle telematic system 54, which communicates via two-way wireless link 56 with a remote telematic service provider 58 (such as an ONSTAR™ system or a dial-in computer server or the like). Telematic service provider 58, upon identifying the location, identity and direction heading of vehicle 52, conveys this data via two-way communication link 60 (also, preferably, a wireless link) to a service provider 62 (such as a gas station, store, cinema, WEB site, toll center, banking center, satellite radio provider, and the like). Service provider 62, upon receipt of input data from vehicle 52 via link 60, provides data/information/service back to vehicle 52 via telematic service provider 58, and preferably with this data/information/service customized to the geographic location and heading of vehicle 52 as generated by GPS system 51.

Also, many mobile devices such as PDAs, cellular phones, and the like, require manual input of data. However, while driving in a car, this may be impractical and/or unsafe for the driver. By linking such mobile devices to a vehicle, as disclosed in the present invention, an in-vehicle voice detectionlvoice recognition/voice generation system, such as are described in commonly assigned U.S. Pat. No. 6,428, 172 issued to Hutzel et al., for a REARVIEW MIRROR ASSEMBLY WITH UTILITY FUNCTIONS, and U.S. Pat. No. 6,420.975 issued to Decline et al., for an INTERIOR REARVIEW MIRROR SOUND PROCESSING SYSTEM, the disclosures of which are hereby incorporated herein by reference, can be used to operate the mobile device while traveling in the vehicle. For example, by using an in-vehicle voice detection/recognition/generation system, and by linking a PDA to the vehicle as disclosed in the present invention, the driver can hear data stored in the PDA (such as calendar information, notes and the like) by playback via the vehicle audio system (and with the vehicle voice generation system receiving digital data stored in the PDA via wireless, or less desirably wired, link of the PDA to the vehicle and then converting this digital data to a simulated voice that reads the digital data to the driver via the vehicle audio system). Likewise, the in-vehicle voice detection/recognition/generation system can receive spoken words from the driver, convert these to digital data, and communicate this to the PDA.

The invention claimed is:

1. A communication system for a vehicle, said communication system comprising:
   an interior rearview mirror assembly;
   a global positioning system determining at least one of the geographic location and the direction heading of the vehicle;
   a wireless communication link from the vehicle to an external provider of information or service;
   said wireless communication link communicating data from the vehicle to said external provider;
   said data including at least one of the geographic location and the direction heading of the vehicle;
   said external provider providing information or service via said wireless communication link to the vehicle;
   said information or service being at least in part customized to at least one of said geographic location and the direction heading of the vehicle; and
   a control at said interior rearview mirror assembly for facilitating operation of said communication system.

2. The communication system of claim 1, wherein a display device is disposed at said interior rearview mirror assembly, and wherein at least one of (a) said display device comprises a multi-pixel display device, (b) said display device is capable of displaying a scrolling display, (c) said display device is capable of displaying a multi-text display, (d) said rearview mirror assembly comprises a mirror casing having a reflective element disposed threat and wherein said display device is disposed behind said reflective element, (e) said rearview mirror assembly comprises a mirror casing having an electrocbromic reflective element disposed threat and wherein said display device is disposed behind said reflective element, (f) said rearview mirror assembly comprises a mirror casing having a reflective element disposed threat and wherein said display device is disposed behind said reflective element, said reflective element comprising a semitransparent visible light reflecting/transmitting reflector and said display device comprising a display on demand display device, (g) said rearview mirror assembly comprises a mirror casing having an electrochromic reflective element disposed threat and wherein said display device is disposed behind said reflective element, said reflective element comprising a semitransparent visible light reflecting/transmitting reflector and said display device comprising a display on demand display device, (h) said rearview mirror assembly comprises a mirror casing having an electrochromic reflective element disposed threat and wherein said display device is disposed behind said reflective element, said reflective element comprising a third surface semitransparent visible light reflecting/transmitting reflector and said display device comprising a display on demand display device.

3. The communication system of claim 1, including at least one of (a) a link to a vehicle bus system, (b) a short-range wireless communication link in the vehicle to a mobile device, (c) a short-range wireless communication link in the vehicle to a mobile device and wherein said mobile device comprises at least one of a keypad, a touch pad and a stylus-actuated screen thereby providing user entry to said communication system via said short-range wireless communication link, (d) a short-range wireless communication link in the vehicle to a mobile device and including a holder in the vehicle for said mobile device, (e) a short-range wireless communication link in the vehicle to a mobile device and wherein said mobile device comprises a personal accessory of an occupant of the vehicle, and (f) a short-range wireless communication link in the vehicle to a mobile device and wherein said mobile device comprises one of a hand-held telephone, a personal digital assistant, a hand-held personal identifier, and a hand-held remote entry device.

4. The communication system of claim 1, including an in-vehicle voice input device and wherein at least one of (a) said in-vehicle voice input device is at said interior rearview mirror assembly, (b) the communication system includes in-vehicle voice detection, (c) the communication system includes voice recognition, and (d) the communication system includes in-vehicle voice generation.

5. The communication system of claim 1, including at least one of (a) a short-range wireless communication link with a mobile device and (b) a short-range wireless communication link with a mobile device, said link comprising a BLUETOOTH link.

6. The communication system of claim 1 wherein said rearview mirror assembly comprises a mirror casing having a reflective element disposed threat and wherein said reflective element comprises an electro-optic reflective element.

7. The communication system of claim 1, wherein at least one of (a) said external provider comprises at least one of a gas station, a store, a cinema, a web-site, a toll center, a banking center, a satellite radio provider, a service supplier, a convenience supplier, a food supplier, a service station and a telematics service, (b) said information or service provided by said external provider via said wireless communication link comprises at least one of a by said external provider via said wireless communication link comprises at least one of a discount, a service offer, an advertisement, entertainment, an INTERNET site, news, weather data and traffic data, (c) said external provider provides connection to the INTERNET, (d) said data communicated via said wireless communication link to said external provider includes at least one of vehicle type data and vehicle identity data, and (e) said data communicated via said wireless communication link to said external provider includes personal information.

8. A communication system for a vehicle, said communication system comprising:
 a global positioning system for determining at least one of the geographic location and the direction heading of the vehicle;
 a wireless communication link from the vehicle to an external provider of information or service;
 said wireless communication link communicating data from the vehicle to said external provider;
 said data including at least one of the geographic location and the direction heading of the vehicle;
 said external provider providing information or service via said wireless communication link to the vehicle;
 said information or service being at least in part customized to at least one of said geographic location and the direction heading of the vehicle; and
 wherein said data communicated via said wireless communication link to said external provider includes at least one of vehicle type data, personal information, and vehicle identity data.

9. The communication system of claim 8 wherein said external provider comprises at least one of a gas station, a store, a cinema, a web-site, a toll center, a banking center, a satellite radio provider, a service supplier, a convenience supplier, a food supplier, a service station, and a telematics service.

10. The communication system of claim 8 wherein said information or service provided by said external provider via said wireless communication link comprises at least one of a discount, a service offer, an advertisement, entertainment, an INTERNET site, news, weather data, and traffic data.

11. The communication system of claim 8 wherein said external provider provides connection to the INTERNET.

12. A communication system for a vehicle, said communication system comprising:
 a global positioning system for determining at least one of the geographic location and the direction heading of the vehicle;
 a wireless communication link from the vehicle to an external provider of information or service;
 said wireless communication link communicating data from the vehicle to said external provider;
 said data including at least one of the geographic location and the direction heading of the vehicle;
 said external provider providing information or service via said wireless communication link to the vehicle;
 said information or service being at least in part customized to at least one of said geographic location and the direction heading of the vehicle;
 wherein said external provider comprises at least one of a gas station, a store, a cinema, a web-site, a toll center, a banking center, a satellite radio provider, a service supplier, a convenience supplier, a food supplier, a service station, and a telematics service; and
 wherein said information or service provided by said external provider via said wireless communication link comprises at least one of a discount, a service offer, an advertisement, entertainment, an INTERNET site, news, weather data, and traffic data.

13. The communication system of claim 12 including at least one of (a) an interior rearview mirror assembly comprising a mirror casing having a reflective element disposed threat and wherein said display device is disposed behind said reflective element,(b) a link to a vehicle bus system, (c) including a short-range wireless communication link in the vehicle to a mobile device, (d) including a short-range wireless communication link in the vehicle to a mobile device wherein said mobile device comprises a personal accessory of an occupant of the vehicle, (e) including a short-range wireless communication link in the vehicle to a mobile device wherein said mobile device comprises at least one of a keypad, a touch pad and a stylus-actuated screen thereby providing user entry to said communication system via said short-range wireless communication link, (f) said short-range wireless communication link comprising a BLUETOOTH link, (g) including a control at an interior rearview mirror assembly for facilitating operation of said communication system, (h) said external provider providing connection to the INTERNET, (i) said data communicated via said wireless communication link to said external provider including at least one of vehicle type data and vehicle identity data and (i) said data communicated via said wireless communication link to said external provider including personal information.

14. A communication system for a vehicle, said communication system comprising:
 a global positioning system determining at least one of the geographic location and the direction heading of the vehicle;
 a wireless communication link from the vehicle to an external provider of information or service;
 said wireless communication link communicating data from the vehicle to said external provider;
 said data including at least one of the geographic location and the direction heading of the vehicle;
 said external provider providing information or service via said wireless communication link to the vehicle;
 said information or service being at least in part customized to at least one of said geographic location and the direction heading of the vehicle; and
 said system including a short-range wireless communication link in the vehicle to a mobile device.

15. The communication system of claim 14, wherein a display device is disposed in the vehicle at a location viewable by the driver while driving, and wherein at least some information displayed by said display device is communicated from said mobile device via said short-range wireless communication link.

16. The communication system of claim 15, wherein said display device comprises at least one of (a) a multi-pixel display device, (b) a display device capable of displaying a scrolling display, (c) a display device capable of displaying a multi-text display, (d) a video display device, (e) a display device disposed at an interior rearview mirror assembly of the vehicle, (f) a display device disposed at an interior rearview mirror assembly of the vehicle and located to the rear of and displaying information through, a reflective element of the interior rearview mirror assembly of the vehicle, (g) a display device disposed at an interior rearview mirror assembly of the vehicle, said rearview mirror assembly comprising a mirror casing having an electrochromic reflective element disposed threat and wherein said display device is disposed behind said reflective element, said reflective element comprising a semitransparent visible light reflecting/transmitting reflector and said display device comprising a display on demand display device, and (h) a display device disposed at an interior rearview mirror assembly of the vehicle, said rearview mirror assembly comprises a mirror casing having an electrochromic reflective element disposed threat and wherein said display device is disposed behind said reflective element, said reflective element comprising a third surface semitransparent visible light reflecting/transmitting reflector and said display device comprising a display on demand display device.

17. The communication system of claim 14, wherein at least one of (a) said communication system includes a link to a vehicle bus system, (b) said mobile device comprises at least one of a keypad, a touch pad, and a stylus-actuated screen thereby providing user entry to said communication system via said short-range wireless communication link, (c) said communication system includes a holder in the vehicle for said mobile device, (d) said mobile device comprises a personal accessory of an occupant of the vehicle and (e) said mobile device comprises one of a hand-held telephone, a personal digital assistant, a hand-held personal identifier and a hand-held remote entry device.

18. The communication system of claim 14, wherein said external provider provides connection to the INTERNET, and wherein said external provider comprises at least one of a gas station, a store, a cinema, a web-site, a toll center, a banking center, a satellite radio provider, a service supplier, a convenience supplier, a food supplier, a service station, and a telematics service, and wherein at least one of (a) said information or service provided by said external provider via said wireless communication link comprises at least one of a discount, a service offer, an advertisement, entertainment, an INTERNET site, news, weather data and traffic data and (b) said data communicated via said wireless communication link to said external provider includes at least one of vehicle type data, personal information and vehicle identity data.

19. The communication system of claim 14, wherein the vehicle is equipped with a vehicular global positioning system operable to provide location/directional information to the driver.

20. A communication system for a vehicle, said communication system comprising:
a global positioning system for determining at least one of the geographic location and the direction heading of the vehicle;
a wireless communication link from the vehicle to an external provider of information or service;
said wireless communication link communicating data from the vehicle to said external provider;
said data including at least one of the geographic location and the direction heading of the vehicle;
said external provider providing information or service via said wfreless communication link to the vehicle;
said information or service being at least in part customized to at least one of said geographic location and the direction heading of the vehicle;
said system including a short-range wireless communication link in the vehicle to a mobile device;
wherein a display device is disposed in the vehicle at a location viewable by the driver while driving and wherein said display device is disposed in the vehicle at a location viewable by the driver while driving and wherein at least some information displayed by said display device is communicated from said mobile device via said short-range wireless communication link; and
said communication system including an in-vehicle voice input device.

21. The communication system of claim 20, wherein at least one of (a) said in-vehicle voice input device is at an interior rearview mirror assembly of the vehicle, (b) the communication system includes in-vehicle voice detection, (c) the communication system includes voice recognition and (d) the communication system includes in-vehicle voice generation.

22. The communication system of claim 20, wherein said short-range wireless communication link comprises a BLUETOOTH link, and wherein the vehicle is equipped with a vehicular global positioning system operable to provide location/directional information to the driver.

23. The communication system of claim 20, wherein at least one of (a) said external provider comprises at least one of a gas station, a store, a cinema, a web-site, a toll center, a banking center, a satellite radio provider, a service supplier, a convenience supplier, a food supplier, a service station and a telematics service, (b) said information or service provided by said external provider via said wireless communication link comprises at least one of a discount, a service offer, an advertisement, entertainment, an INTERNET site, news, weather data and traffic data, (c) said external provider provides connection to the INTERNET, (d) said data communicated via said wireless communication link to said external provider includes at least one of vehicle type data and vehicle identity data, and (e) said data communicated via said wireless communication link to said external provider includes personal information.

24. The communication system of claim 20, wherein said display device comprises at least one of (a) a multi-pixel display device, (b) a display device capable of displaying a scrolling display, (c) a display device capable of displaying a multi-text display, (d) a video display device, (e) a display device disposed at an interior rearview mirror assembly of the vehicle, (f) a display device disposed at an interior rearview mirror assembly of the vehicle and located to the rear of, and displaying information through, a reflective element of the interior rearview mirror assembly of the vehicle, (g) a display device disposed at an interior rearview mirror assembly of the vehicle, said rearview mirror assembly comprising a mirror casing having an electrochromic reflective element disposed threat and wherein said display device is disposed behind said reflective element, said reflective element comprising a semitransparent visible light reflecting/transmitting reflector and said display device comprising a display on demand display device, and (h) a display device disposed at an interior rearview mirror assembly of the vehicle, said rearview mirror assembly comprises a mirror casing having an electrochromic reflective element disposed threat and wherein said display device is disposed behind said reflective element, said reflective element comprising a third surface semitransparent visible light reflecting/transmitting reflector and said display device comprising a display on demand display device.

25. The communication system of claim 20, wherein at least one of (a) said communication system includes a link to a vehicle bus system, (b) said mobile device comprises at least one of a keypad, a touch pad and a stylus-actuated screen thereby providing user entry to said communication system via said short-range wireless communication link, (c) said communication system includes a holder in the vehicle for said mobile device, (d) wherein said mobile device comprises a personal accessory of an occupant of the vehicle, (e) said mobile device comprises one of a hand-held telephone, a personal digital assistant, a hand-held personal identifier and a hand-held remote entry device, and (f) a control is provided at an interior rearview mirror assembly of the vehicle for facilitating operation of said communication system.

* * * * *

UNITED STATES PATENT AND TRADEMARK OFFICE
CERTIFICATE OF CORRECTION

PATENT NO.       : 7,382,289 B2
APPLICATION NO.  : 11/053436
DATED            : June 3, 2008
INVENTOR(S)      : Kevin C. McCarthy and Niall R. Lynam It is certified that error appears in the above-identified patent and that said Letters Patent is hereby corrected as shown below:

Title Page, Item (57) Abstract:
Line 6, "conimunication" should be --communication--.

Column 5:
Line 41, "backed" should be --backend--.

Column 8:
Line 51, "ELECTROCUROMIC" should be --ELECTROCHROMIC--.

Column 9:
Line 21, "detectionlvoice" should be --detection/voice--.
Line 25, "Decline" should be --DeLine--.

Column 10:
Line 3, Claim 2, "threat" should be --thereat--.
Line 6, Claim 2, "electrocbromic" should be --electrochromic--.
Line 6, Claim 2, "threat" should be --thereat--.
Line 10, Claim 2, "threat" should be --thereat--.
Line 16, Claim 2, "threat" should be --thereat-.
Line 22, Claim 2, "threat" should be --thereat--.
Line 60, Claim 2, "threat" should be --thereat--.

Column 11:
Lines 5-6, Claim 7, Delete "by said external provider via said wireless communication link comprises at least one of a" after "a".

Column 12:
Line 11, Claim 13, "threat" should be --thereat--.
Line 30, Claim 13, "(i)" should be --(j)--.
Line 65, Claim 16, "rear of" should be --rear of,--.

UNITED STATES PATENT AND TRADEMARK OFFICE
CERTIFICATE OF CORRECTION

PATENT NO. : 7,382,289 B2
APPLICATION NO. : 11/053436
DATED : June 3, 2008
INVENTOR(S) : Kevin C. McCarthy and Niall R. Lynam It is certified that error appears in the above-identified patent and that said Letters Patent is hereby corrected as shown below:

Column 13:
Line 3, Claim 16, "threat" should be --thereat--.
Line 11, Claim 16, "threat" should be --thereat--.
Line 59, Claim 20, "wfreless" should be --wireless--.

Column 14:
Line 51, Claim 24, "threat" should be --thereat--.
Line 59, Claim 24, "threat" should be --thereat--.

Signed and Sealed this

Twenty-second Day of December, 2009

David J. Kappos
*Director of the United States Patent and Trademark Office*